March 9, 1937.  G. A. LYON  2,072,896
COVER FOR THE SPARE TIRES OF AUTOMOBILES
Original Filed April 20, 1929  3 Sheets-Sheet 1
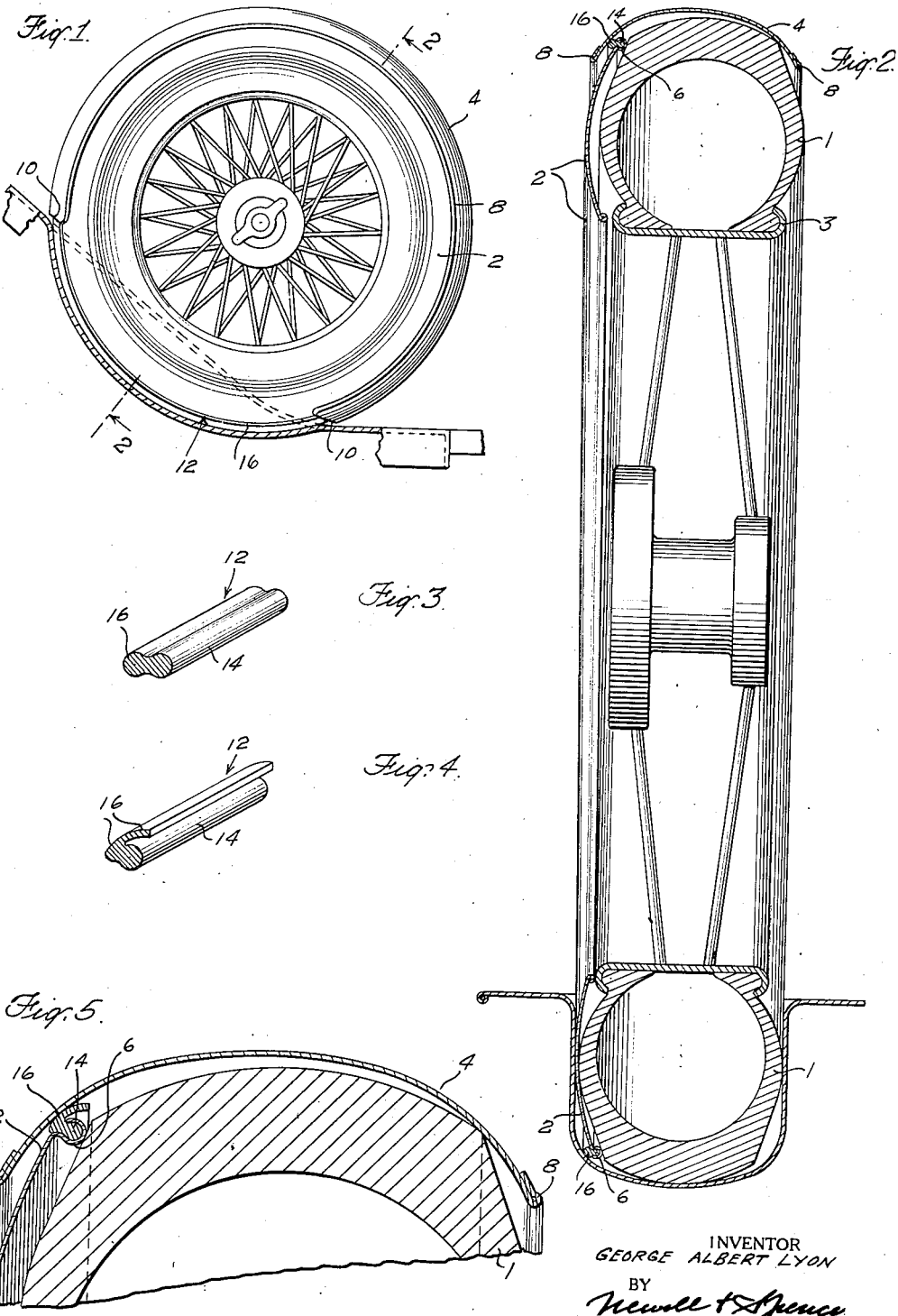
INVENTOR
GEORGE ALBERT LYON
BY
ATTORNEYS March 9, 1937.                     G. A. LYON                    2,072,896
                    COVER FOR THE SPARE TIRES OF AUTOMOBILES
                Original Filed April 20, 1929      3 Sheets-Sheet 2
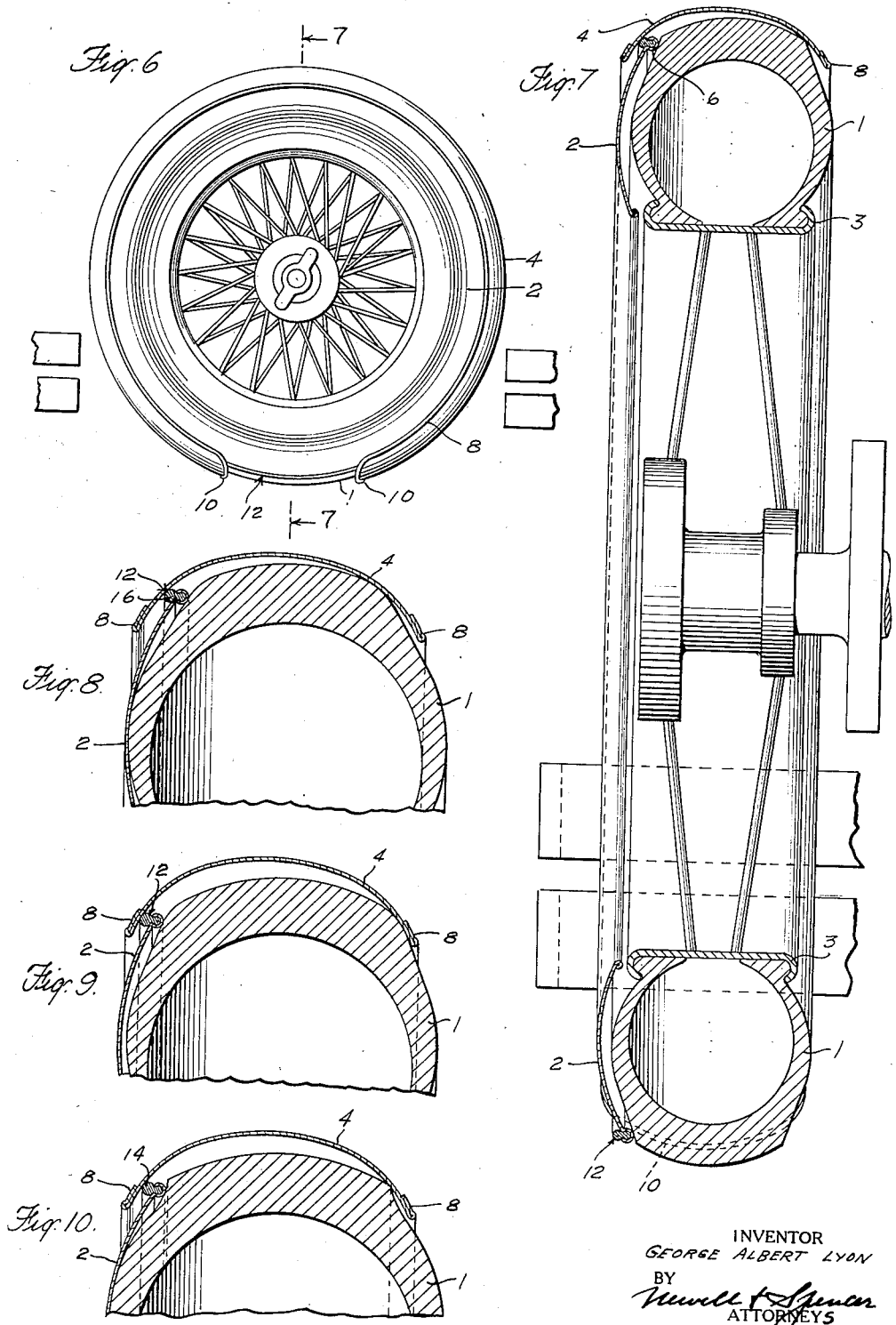
INVENTOR
GEORGE ALBERT LYON
BY
ATTORNEYS March 9, 1937.  G. A. LYON  2,072,896
COVER FOR THE SPARE TIRES OF AUTOMOBILES
Original Filed April 20, 1929   3 Sheets-Sheet 3
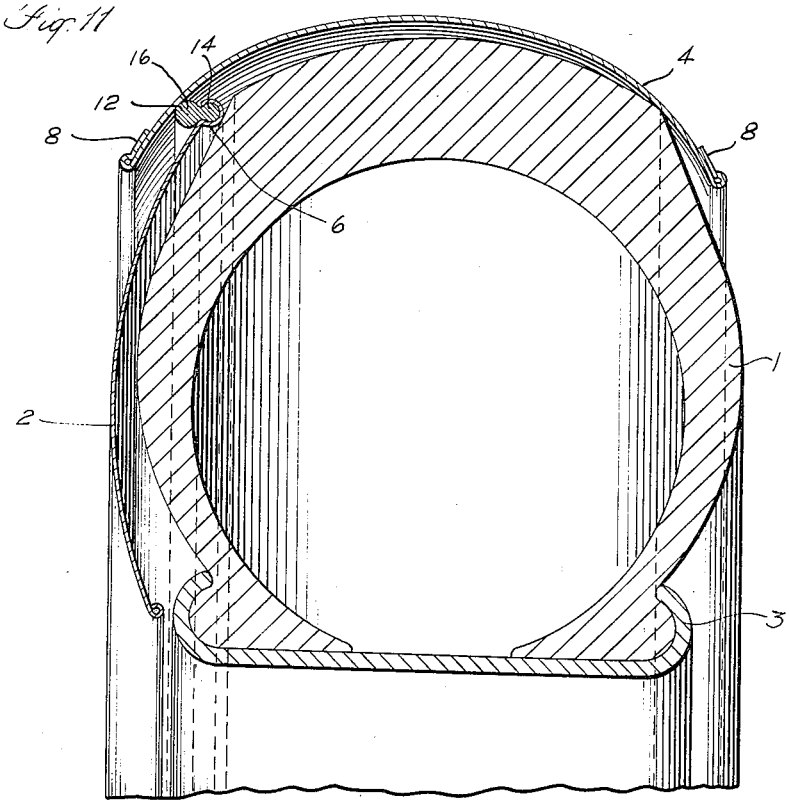
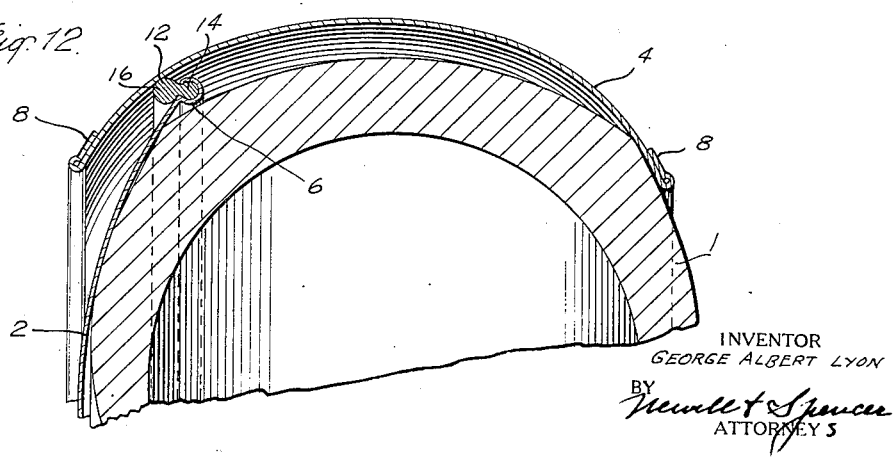
INVENTOR
GEORGE ALBERT LYON Patented Mar. 9, 1937

2,072,896

UNITED STATES PATENT OFFICE 2,072,896

COVER FOR THE SPARE TIRES OF AUTOMOBILES

George Albert Lyon, Allenhurst, N. J., assignor to Lyon Incorporated, Asbury Park, N. J., a corporation of Delaware Application April 20, 1929, Serial No. 356,688
Renewed January 4, 1935

12 Claims. (Cl. 150—54)

This invention relates to covers for the spare tires of automobiles.

The invention relates to tire covers of the general character shown and described in applicant's pending application Serial No. 327,552, filed December 21, 1928 now Patent No. 1,807,697, June 2, 1931. The tire cover shown in said application briefly described, comprises a member made of relatively stiff sheet material such as sheet metal constructed to cover one side of a spare tire, and a ring of similar material constructed to surround the periphery of the tire and to overlap the side member and hold the side member in place on the tire. The present invention consists primarily in an improvement on the construction shown in said application.

The principal objects of the present invention are to improve the construction and mode of operation of tire covers of the above class and to produce a tire cover of this character which will fit different shapes of tires and in which one size of tire cover will fit tires having a relatively wide range in their outside diameters.

Another object of the invention is to produce a tire cover of this class which will fit tightly in a fender well so as to eliminate vibration.

Another object of the invention is to produce a tire cover of this character in which the tire cover will not be permanently dented or bent by contact with another car in case of slight collision.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Figure 1 is a view partly in side elevation and partly in section showing a tire cover embodying the invention applied to a tire mounted on a spare wheel, the wheel being supported in a recess or well in the fender;

Figure 2 is a sectional view of the tire cover, tire and wheel shown in Figure 1, taken substantially on the line 2—2 of Figure 1;

Figure 3 is a detail detached view in perspective illustrating one form of one of the elements of the tire cover;

Figure 4 is a view similar to Figure 3 illustrating another form of the said element;

Figure 5 is a transverse sectional view of a portion of the tire cover applied to a tire, said view being taken in a plane substantially diametrical to the tire;

Figure 6 is a view in elevation illustrating the tire cover applied to a tire supported on a tire carrier at the rear of an automobile;

Figure 7 is a sectional view taken substantially on the line 7—7 of Figure 6;

Figures 8, 9 and 10 are detail transverse sectional views illustrating the tire cover applied to tires of different shapes;

Figure 11 is a view in transverse section showing the tire cover applied to a tire, the tread portion of which is of full thickness; and Figure 12 is a similar view showing the tire cover applied to a tire, the tread surface of which has been worn down.

The tire cover is shown in the drawings as applied to a tire 1 mounted on a rim 3, forming part of a wire wheel.

In the form of the invention illustrated in the drawings, the tire cover comprises a cover member 2 constructed to cover one side of a tire and a cover member 4 constructed to extend about and cover the periphery of the tire. The cover member 2 is formed of relatively thin resilient sheet material, such as sheet metal, and may be made in the form of a ring, as shown in the drawings, or in the form of a plate constructed to extend from the axis of the tire and rim to, or substantially to, the periphery of the tire. This cover member is constructed to conform, to a certain degree, to the convex curvature of the side wall of a tire, and to this end is concavo-convex in cross section. This cover member is applied to the tire with the concave side adjacent the side wall of the tire, as shown in the drawings. In the present construction, the side cover member 2 is formed with a lateral bend indicated at 6 at its periphery which engages the side wall of the tire and the said cover member may be spaced from the side wall of the tire at points within its periphery, as shown in Figures 2, 5, 7, 9 and 11, or said member may contact with the side wall of the tire in the manner shown in Figures 8, 10 and 12. This member when made in ring form, is preferably constructed as a continuous ring.

The member 4 of the tire cover which is constructed to extend about the periphery of the tire also has a concavo-convex form in cross section so as to fit over the periphery of the tire, the tread portion of the tire engaging in the concavity in this member. The cover member 4 is formed to extend transversely across the tread portion of the tire and to project for some distance beyond the tread portion at its margins. The member 4 is applied to the tire outside of the side cover member 2 and the side marginal portions of the member 4 respectively will overlap the side cover member and the opposite side wall of the tire for some distance, as shown. The marginal portions of the cover member 4 are turned back upon the body thereof, as indicated at 8, to form rounded edges.

The member 4 is made in the form of a divided ring and is constructed of a size somewhat smaller than the tire to which it is to be applied. This member is also preferably formed so that the end portions thereof indicated at 10 are separated by a space when said member is applied to a tire. This member is also preferably made of resilient material so that it may be expanded in applying the same to a tire and that the resiliency of the material will cause the said member to contract upon the tire when released after its application thereto.

The member 4 of the cover may be formed from a strip of sheet metal stock and may be given substantially the shape shown in the drawings by cold rolling operations. The cold rolling operations will give this member the required degree of resiliency so that it will grip the tire securely upon contraction of said member. The side cover member 2 of the tire cover may be formed into substantially the shape shown in the drawings, from sheet metal stock by stamping and rolling operations.

As above stated, both the member 4 of the tire cover and the member 2 are made of resilient sheet material. In applying the tire cover to a tire, the cover member 2 is first applied to the side of a tire and the member 4 is then expanded and placed over the tire so that it will overlap the member 2 on one side of the tire and the side wall of the tire on the other side thereof. Upon the release of the member 4, the resiliency of the material will cause the same to contract upon the tire.

The cover member 4, when in place upon the tire is arranged to hold the side cover member 2 in position. In order to hold the overlapping margin of the cover member 4 out of contact with the metal of the side cover member 2, the side cover member is provided with a resilient pad indicated at 12, interposed between the margin of the cover member 2 and the overlapping margin of the cover member 4. This pad consists of a strip of relatively soft yielding material and may be made in different forms. In the form shown in Fig. 3, the pad consists of a strip of fabric impregnated with asphaltum. In the construction shown in Fig. 4, the pad consists of a strip of vulcanized rubber. In each case, the strip comprises a body 14 preferably of cylindrical form by which it is attached to the side cover member 2, and a projecting portion 16 for engagement with the inner face of the cover member 4. The strip is secured to the side cover member 2 by bending the peripheral portion of said member about the portion 14 of the strip. The strip 12 not only prevents metal-to-metal contact between the side member 2 and the peripheral cover member 4, but also furnishes a relatively narrow surface for contact with the peripheral cover member. The peripheral cover member is held by its contact with the strip 12 out of engagement with the adjacent portion of the tread of the tire. Said member contacts with the tire itself only along a relatively narrow surface or strip upon or adjacent to the opposite side of the tire tread. This enables the tire cover to adapt itself readily to tires of different shapes and also enables one size of cover to fit tires having outside diameters varying through a relatively wide range.

When the tire cover is to be applied to a tire supported within a fender well, the cover is made preferably substantially in the form shown in Fig. 1. As shown in this figure, the peripheral cover member 4 of the tire cover is made in the form of a divided ring, the end portions 10 of which are separated by a space sufficiently great to enable them to clear the fender when the tire with the tire cover applied thereto is placed in the fender well. The tire and cover are placed in the fender well in the position shown in Fig. 1 with the portion of the tire and the member 2 between the end portions 10 of the member 4 extending down into the well and with the end portions 10 just clearing the fender. As shown in Figure 2, when the tire with the tire cover applied thereto is inserted in the fender well, the side cover member 2 is engaged by the side wall of the fender well and forced laterally toward the tire, the flexibility of the side cover member readily enabling said member to bend in this manner. This bending of the side cover member places the same under tension and the high degree of resilience of the material of which this member is made causes the same to press yieldingly against the side wall of the fender well. The pressure exerted by one side of the fender well upon the side cover member 2 and the resilience of this cover member will force the opposite side of the tire against the other side of the fender well. Thus, the tire cover and tire will press yieldingly against the side walls of the fender well and objectionable vibration and consequent rattle will be effectively prevented. As shown in Fig. 2, when a tire with the tire cover applied thereto is inserted in the fender well, the tread surface of the tire rests upon the bottom surface of the well.

Figures 2, 5, 8, 9 and 10 show the manner in which the tire cover will adapt itself to tires of different shapes. Because of its being supported at two separated points transversely of the tire, the cover member 4 can readily adjust its position to fit different shapes of tires. The cover member 4 must always contact with the buffer strip 12 in order to hold the side cover member in position. The member 4 also contacts with the tire at points preferably along the opposite margins of the tire tread. The cover member 4 is preferably so formed that between these two points of support transversely of the tire, said member is spaced from the tread surface of the tire. In the construction shown, the central portion of the tire cover member 4 between its margins is curved transversely in an arc of a certain radius and the side marginal portions of said member are curved in arcs of considerably less radius than the radius of curvature of the central portion.

Figures 2, 5, 8, 9 and 10 show the tire cover applied to tires of different cross-sectional shapes which are found in certain tires now in commercial use. In the tires shown in Figures 2, 5, 7 and 10, relatively sharp shoulders are formed between the tread surface and the side walls. Figures 2 and 5 show tires of the same shape. The tire shown in Figure 10 differs from those shown in Figures 2 and 5 in that the tread is considerably narrower in proportion to the diameter of the tire. In the tires shown in Figures 8 and 9, rounded shoulders are formed between the tread surface and the side walls and the tread surface in each case has a radius of transverse curvature somewhat less than the radius of curvature of the tread surfaces of the tire shown in Figures 2, 5 and 10. The tire shown in Figure 8 differs in shape from that shown in Figure 9 chiefly in that the tread portion is narrower. It will be noted that the tire cover adapts itself readily to these various shapes. With the tire shapes shown in Figures 2, 5 and 9 considerable space occurs between the side wall of the tire and the side cover member 2 at all points inwardly from the margin of said cover member which engages the side wall of the tire. This will enable the cover member to adapt itself readily to tires of the shapes shown in Figures 8 and 10 in which the diameter of the tire is much greater in proportion to the width of the tread. The construction and formation of the cover member 4 so that it is supported only by the buffer strip 12 and by a relatively narrow surface at the opposite side of the tread enable this cover member readily to adapt itself to treads of different widths and of different radii of curvature as shown.

The tire cover as above stated also will adapt itself to tires, the outside diameters of which vary between wide ranges. Thus the cover will fit a new tire and will also fit this tire after the tread surface has become worn down to a considerable degree, as shown in Figures 11 and 12. Figure 11 shows the tire cover applied to a tire, the tread portion of which is of substantially full thickness. Figure 12 shows the tire cover applied to the same tire after the tread surface has been worn away to a considerable degree, thereby reducing the outside diameter of the tire. It will be noted that in adapting itself to the reduced tire diameter, the cover member 4 is shifted laterally to the left so as to bring a part of said member nearer the central line thereof into engagement with the strip 12 and to bring a part of said member nearer the right-hand margin into contact with the tire.

The cover member 4 is preferably made of material somewhat heavier or thicker than the material of the cover member 2 so that the member 4 will exert the contracting force required to hold both cover members on the tire. The member 2 is made of considerably thinner material so that this member will yield readily under pressure and at the same time will be highly resilient so that it will restore itself to its original condition when the pressure is released.

In actual practice the member 4 has been made of 20 gauge steel having a thickness of .0375 inch and the side cover member 2 has been made of 26 gauge steel having a thickness of .0189 inch.

When the tire cover is to be applied to a tire supported on a tire carrier at the rear of an automobile, the cover member 4 is preferably constructed so that when applied to a tire, its ends will be separated by a space considerably less than in the construction shown in Fig. 1. This is illustrated in Figure 6 of the drawings.

The cushioning element or pad 12 may be made in the form of a single strip extending completely about the member 2 of the cover or it may consist of several separate sections located at spaced intervals about said member.

In applying the tire cover to a tire, the tire and rim are preferably placed in a horizontal position on the ground or upon any other suitable support. The side cover member 2 is then laid upon the upper side of the tire in substantially the position shown in Figure 2 with relation to the tire. The peripheral cover member 4 is then applied to the tire. In applying this member, said member is expanded so that it will pass over the peripheral portion of the tire and is positioned with the tread portion of the tire engaging in the concavity in the interior of said member and with the margins of said member extending beyond the tread surface of the tire on each side thereof, as clearly shown in the drawings, one margin overlapping the side cover member on the outside thereof. Upon the release of the member 4 after its expansion, said member will contract because of the resiliency of the material and will securely grip the tire on one side of the tread and will engage the cushioning member 12 on the other side of the tread so as to hold the said cover member 2 securely in position. Thus the contraction of the peripheral cover member 2 will hold both members securely in position on the tire.

The cover members 2 and 4 are held from contact with each other by the resilient cushion strip 12 so that there will be no obectionable rattles or other noises produced by the relative movement of the two members during the running of the car. The cover may be very quickly and easily applied to and removed from the tire by simple, easy and convenient manual operations.

The tire cover above described is very attractive in appearance, particularly when a coating of nickel or enamel is applied thereto and furnishes a reliable and satisfactory protection for the tire at all times. When the tire with the cover applied thereto is placed in a running-board well, and the tire is locked in position, the cover cannot be removed from the tire by an unauthorized person.

It is to be undestood that the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. In a multi-part tire cover, a side plate-like part for disposition over only a side of a tire, and a peripheral or tread covering member of transverse convex curvature for disposition over the tread of the tire and formed to extend from said side part over substantially only the tread of the tire, said member being so proportioned and of such cross sectional shape as to have only a shiftable line contact with said side part at one side of the tread and a shiftable line contact with the other side of said tread, said tread covering member having an intermediate portion of a greater radius of curvature than that of the marginal portions thereof to provide for said line contacts.

2. In a multi-part tire cover, a side plate-like part for disposition over only a side of a tire, a peripheral or tread covering member of trensverse convex curvature for disposition over the tread of the tire and formed to extend from said side part over substantially only the tread of the tire, said member being so proportioned and of such cross sectional shape as to have only a shiftable line contact with said side part at one side of the tread and a shiftable line contact with the other side of said tread, and a yieldable pad between said part and member for defining the line of contact therebetween and for holding said member out of contact with the adjacent side portion of said tread, said tread covering member having an intermediate portion of a greater radius of curvature than that of the marginal portions thereof to provide for said line contacts and for the accommodation of said pad.

3. In a spare tire cover construction, cushioning means for disposition between members adapted to conceal a portion of the tire, said means comprising an 8-shaped rubber bead so that either part thereof may be selectively clinched in one member and the other part extended free and engaged with the other member to cushion the members apart.

4. In a well-mounted spare wheel and cover assembly, a cover member disposed at a side of the wheel and projecting into the well, and cushioning means secured to said member and engaging an adjacent wall of the well and spacing said member from said wall.

5. In a well-mounted spare wheel and cover assembly, a cover member disposed at a side of the wheel and projecting into the well, and cushioning means secured to said member and engaging an adjacent edge of the well and spacing said member from said edge.

6. In a well-mounted spare wheel and cover assembly, a cover member disposed at a side of the wheel and projecting into the well, and cushioning means secured to said member and engaging an adjacent wall of the well and spacing said member from said wall, said means being arranged in a substantially circular formation on and about the axis of said member so as to space any part of the member so projecting from said wall.

7. In a well-mounted spare wheel and cover assembly, a cover member disposed at a side of the wheel and projecting into the well, cushioning means secured to said member and engaging an adjacent wall of the well and spacing said member from said wall, said means being arranged in a substantially circular formation on and about the axis of said member so as to space any part of the member so projecting from said wall, and a cover member for the portion of the tire tread outside of the well, the second cover member terminating at the mouth of the well and being spaced from the first cover member by a portion of said cushioning means outside of the wall, whereby said means performs the double function of cushioning the first cover member relative to both the well and the second cover member.

8. In a well-mounted spare tire rim and cover assembly, a cover member having a part projecting into the well between the rim and a wall of the well, a portion of the projecting part of said member being transversely resilient and being resiliently distorted by pressure exerted thereupon by said wall toward the rim whereby rattling of said member in the well is prevented.

9. In a well-mounted spare tire rim and cover assembly, a cover member having a part projecting into the well between the rim and a wall of the well, a portion of the projecting part of said member being transversely resilient and being resiliently distorted by pressure exerted thereupon by said wall and the rim whereby rattling of said member in the well is prevented.

10. In a well-mounted spare tire rim and cover assembly, a side covering member of substantially form-retaining transversely resilient sheet material at a side of the rim and projecting into the well, the portion so projecting being transversely distorted by the adjacent wall of the well into engagement with the rim.

11. In a well-mounted spare tire rim and cover assembly, a side covering member of substantially form-retaining transversely resilient sheet material at a side of the rim and projecting into the well, the portion so projecting being transversely distorted by the adjacent wall of the well into engagement with the rim, said member being transversely bowed to substantially conform to the adjacent side wall of the tire, and a resilient pad secured between the well and the outer periphery of said member to assist in the prevention of rattling of said member.

12. In combination with an assembly including a well-mounted spare tire and rim, a cover for a side of the assembly, said cover comprising a substantially circular sheet material member disposed at a side of the assembly and projecting into the well between a wall of the well and the assembly, said material being transversely resilient and engaged by said wall and compressed between said wall and a part of the assembly so as to exert resilient pressure against said wall and part, whereby said member may cooperate with the well in accommodating tires of different widths without rattling.

GEORGE ALBERT LYON.